UNITED STATES PATENT OFFICE.

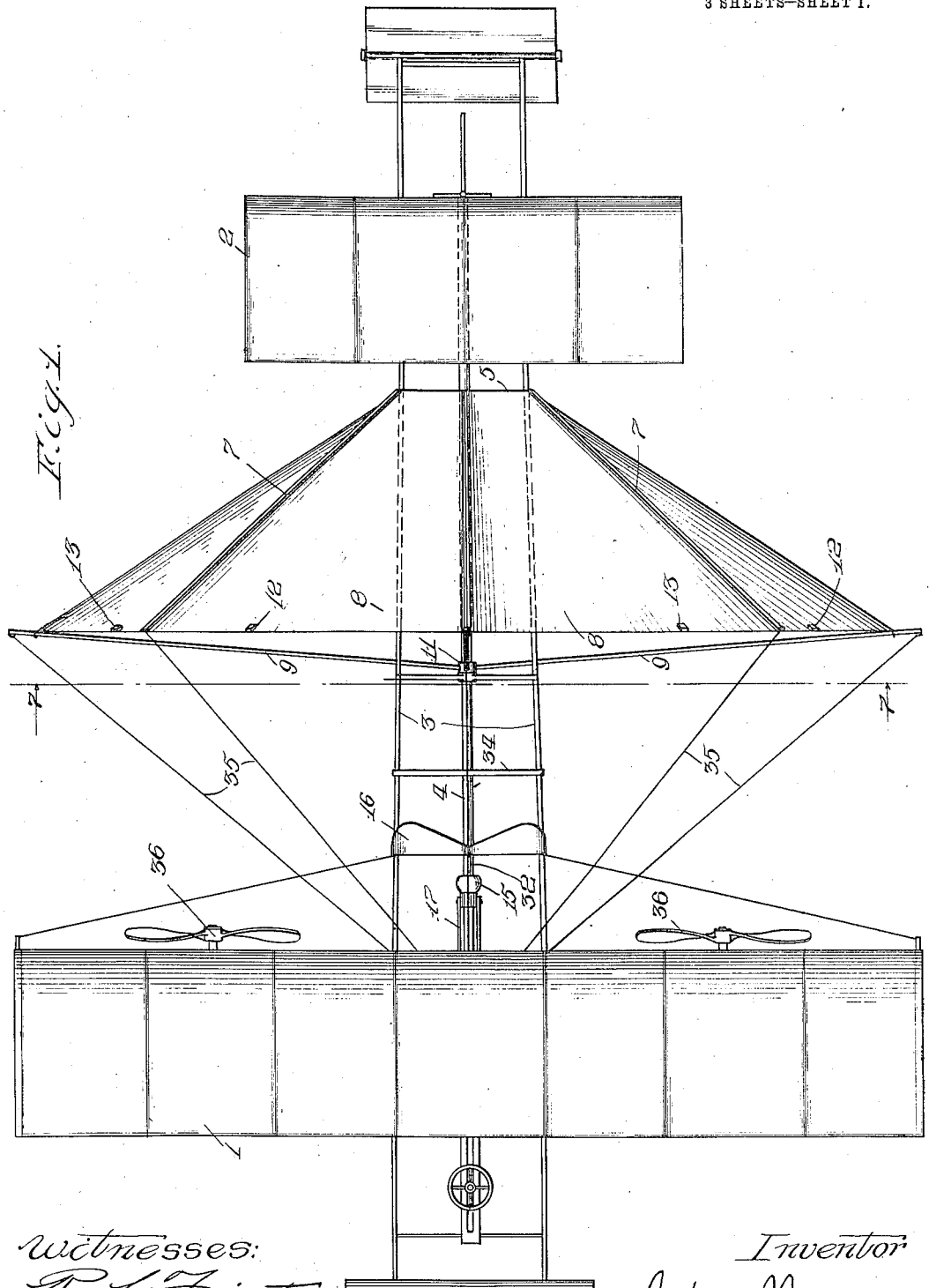

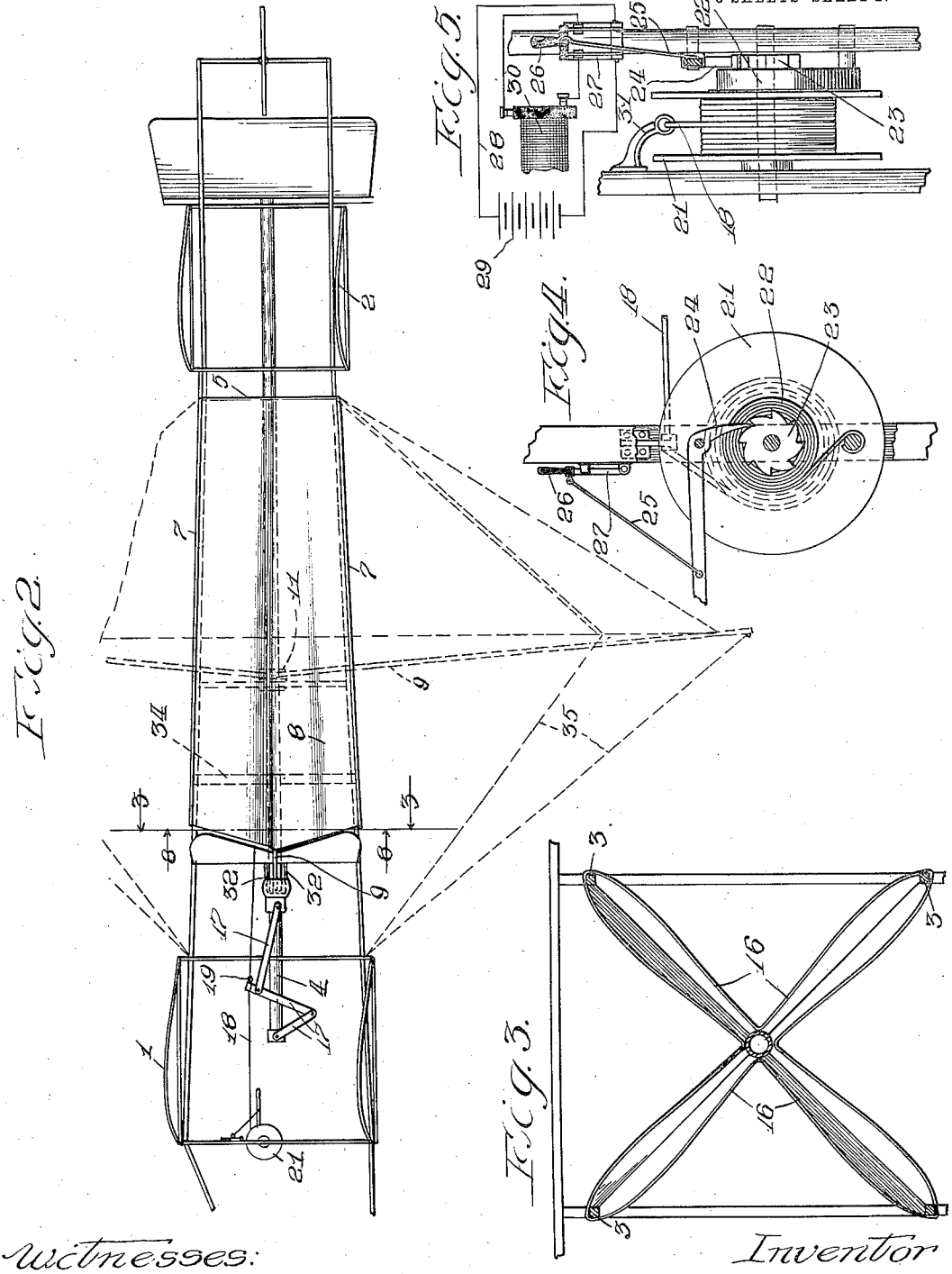

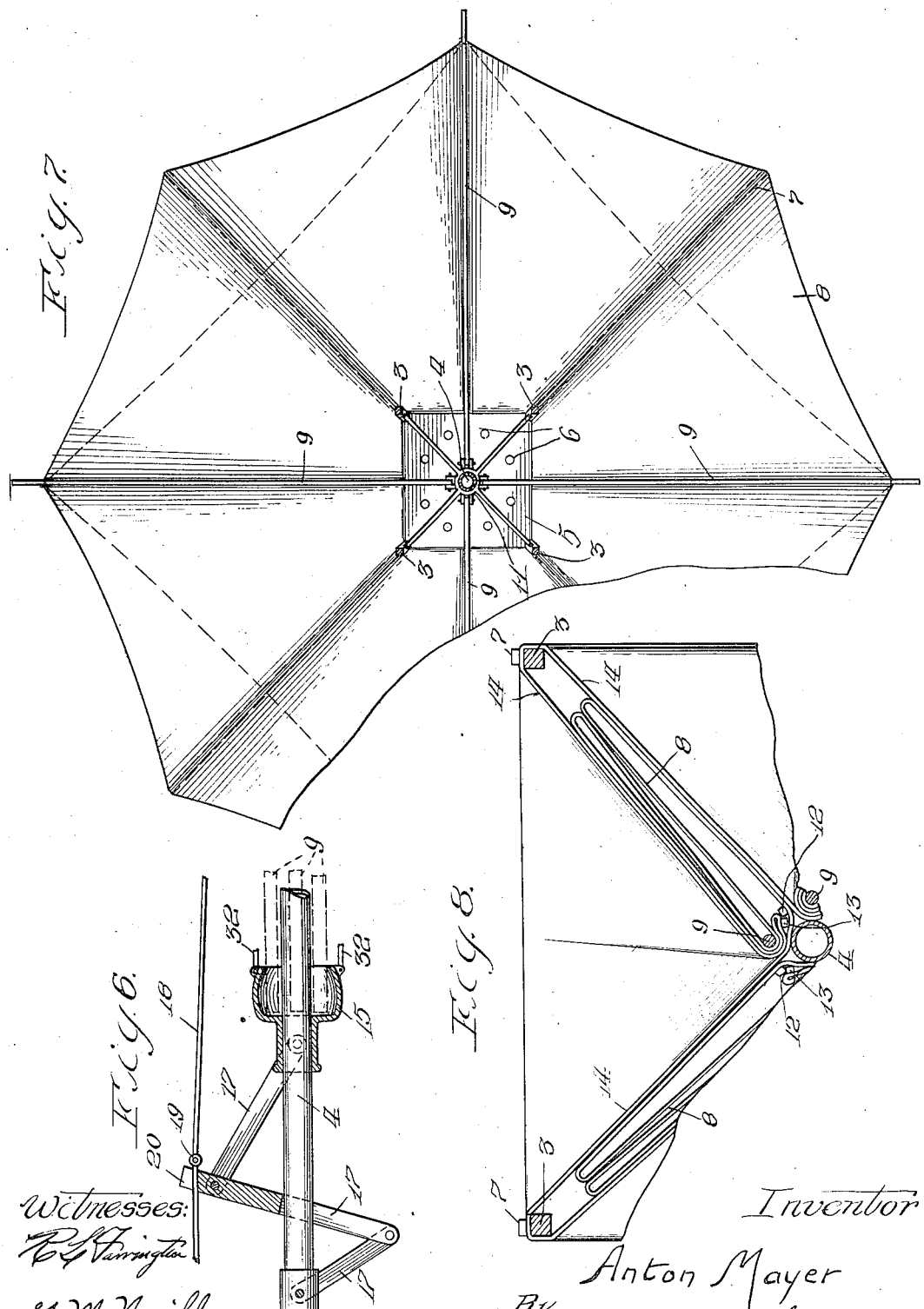

ANTON MAYER, OF CHICAGO, ILLINOIS.

AIRSHIP.

1,125,365.   Specification of Letters Patent.   Patented Jan. 19, 1915.

Application filed November 10, 1913. Serial No. 800,156.

*To all whom it may concern:*

Be it known that I, ANTON MAYER, subject of the Emperor of Germany, residing at Chicago, in the county of Cook and State of Illinois, have invented certain new and useful Improvements in Airships; and I do hereby declare the following to be a full, clear, and exact description of the invention, such as will enable others skilled in the art to which it appertains to make and use the same.

My invention relates to airships and more particularly to safe-guards for preventing an abnormally rapid descent of an airship in case of an accident to the same.

One object of my invention is to provide a parachute permanently attached to the framework of the airship and adapted when expanded to retard the speed of the airship in descending.

Another object is to provide a parachute attachment so disposed as to offer very little resistance to the normal motion of the airship, and equipped with easily operable latching mechanism for holding the membranes of the parachute in their normal positions.

Still another object is to provide means for insuring the speedy opening of the parachute in emergencies, and for simultaneously stopping the engines or propelling mechanism.

Further objects will appear from the following specification and from the accompanying drawings, in which various portions of the airship have been omitted for the sake of clearness.

Figure 1 is a plan view of an airship equipped with my invention. Fig. 2 is a fragmentary horizontal view showing the parachute attachment and a portion of the mechanism for opening the same. Fig. 3 is an enlarged transverse section through Fig. 2 along the line 3—3. Fig. 4 is an enlarged detail view of a spring-actuated portion of the parachute opening mechanism of Fig. 2. Fig. 5 is a side view of the same. Fig. 6 is an enlarged detail view of a portion of the mechanism for releasing the membranes of the parachute. Fig. 7 is a transverse section through Fig. 1 along the line 7—7. Fig. 8 is an enlarged fragmentary section showing the method of folding and retaining the membranes.

In the embodiment of the drawings, my invention is shown as applied to an airship of the biplane type having upper and lower pairs of front planes 1 and rear planes 2 connected by substantially parallel frame members 3, these frame members preferably being four in number and equidistant from an axis or shaft 4 extending longitudinally of the airship. Extending transversely across the prismatic space inclosed by the said frame members 3 near the forward end of the rear planes 2 is a web 5 having a plurality of perforations 6 therein. This web 5 forms the top for a parachute comprising eight webs 8 connected at their smaller ends to the upper web 5 and stretched between ribs 7, the ribs 7 being alternately pivoted to the frame members 3 and suitably pivoted at points along the edge of the web 5 midway between consecutive frame members 3, the precise method of supporting said ribs being unimportant, and hence not shown in the drawings. Slidably mounted upon the shaft 4 in front of the web 5 is a sleeve 11 connected by links 9 to every other one of the said ribs 7, so that the sliding of this sleeve toward the web will cause the said links to open the parachute symmetrically, the intermediate ribs 7 being carried outward at the same time by the rush of air into the interior of the parachute. Normally, the ribs 7 extend substantially parallel to the frame member 3, as shown in Fig. —2—, the said movement of the sleeve 11 permitting the ribs to move to the positions shown in dotted lines in the same figure and in full lines in Fig. —7—. To prevent the webs of the parachute from exposing a large surface when the airship is in normal motion and thereby retarding the movement of the latter, these webs are normally folded about the frame members 3 into a substantially star-shaped section, as shown in Fig. 8. To effect this folding, I equip each of the webs 8 with a pair of stops 12 and 13, which stops are adapted to interlock with each other when the web carrying the same is folded back and forth about the adjacent main rib 9 as shown in Fig. 8. After each of the webs has thus been folded and interlocked with the outer surface portions 14 comparatively taut, the free ends of the main ribs 9 are all retained close to the tubular shaft 4 by sliding a cup-shaped member 15 over the said ends as shown in Fig. 6. Likewise, the exposed end portions of the folded webs are preferably protected by a shield 16 having a channel sectioned portion adapted to cover the openings between the outer webs 14 at the forward end of each of the webs 8 and to deflect air impinging upon the said shield when the airship is in motion, so that this air will not forcibly enter the interior of the folded webs and possibly rupture the latter.

When the parachute is to be opened, I draw the cup-shaped retaining member 15 out of its engagement with the ends of the ribs 9 by a forward motion of links 17, connected at their opposite ends to the said cup member 15 and the shaft 4. To effect this forward movement of the said links, I employ a cord 18 having a knot or stop 19 normally engaging a forked or slotted portion 20 of one of the links 17 and leading to a drum 21 upon which the said cord is adapted to be wound. The drum 21 is equipped with a spiral spring 22 tending to rotate the said drum so as to wind the cord thereupon, the drum being normally kept from such rotation by a ratchet 23 mounted upon the drum and engaged by a pawl 24, which pawl is attached by a rigid link 25 to the handle 26 of a switch 27 controlling the circuit 28 leading from a battery 29 to the spark coil 30 of the ignition equipment of the engine or engines of the airship. When the handle 26 is moved to open the said switch, it causes the link 25 to move the pawl 24 out of engagement with the ratchet wheel 23, thereby permitting the spring 22 to rotate the drum 21, whereupon the latter rapidly winds the cord 18 thereupon, the said cord being preferably kept from entangling by a guide 31 mounted in proximity to the said drum. When the cord is thus drawn, the projections 19 thereon coact with the links 17 to move the retaining member 15 out of engagement with the ribs 9, permitting air entering the interior of the folded parachute to expand the latter. To prevent the wind shield 16 from interfering with the rapid opening of the parachute, I preferably mount the said shield slidingly upon the shaft 4 and connect it to the cup 15 by rods 32, so that this shield will be withdrawn from its normal position when the cup 15 is drawn out of engagement with the free ends of the ribs 9. As soon as the said ribs and the edges of the webs normally hooded by the said shield are thus released, air entering the interior of the folds of the webs will cause the latter to expand so as to open the parachute. However, the entrance of the air into the respective webs might not be uniform, particularly if the airship is exposed to a side wind, and the consequent irregularities in the expansion of the various webs might interfere with the rapid opening of the parachute. I therefore preferably provide auxiliary means for simultaneously starting the opening of all of the said folded webs, as for example, webs 34 of elastic material stretched peripherally around the frame members 3 and bearing outwardly against the main ribs 9 of the parachute, these webs being sufficiently elastic to permit of their being flexed inwardly close to the shaft 4 when the ribs 9 are in their normal position adjacent to the said shaft. Since the action of the spring 22 through the cord 18 releases the said ribs, the flexible members 34 will simultaneously force all of the ribs outwardly, thereby starting a uniform opening of the parachute so that the air entering the interior of the latter can quickly open the same into the position of Figs. 1 and 7, a still further opening thereof being prevented by cords 35 secured respectively to the ribs and operating members of the parachute and to portions of the framework of the airship disposed forwardly of the parachute.

In operation, it will be evident that in case of an accident to the engine or engines, the propellers 36, or other portions of the mechanism of the airship, whereby the latter is disabled, the greater weight of the forward end of the airship will cause this end to dip downwardly, so that the airship would descend endwise with a steadily increasing velocity unless checked. It will also be evident that if during such a mishap the engine should continue to operate, the propellers would increase the speed of descent of the airship. By providing the safety equipment of my invention, I enable the aviator simultaneously to guard against both of these causes of rapid headlong descent of the airship, since his pulling the handle 26 will simultaneously open the ignition circuit of the engine so as to stop the operation of the latter and also effect the opening of the parachute so as to check the rapidity of descent of the airship. To prevent a rupturing of the webbing by the upward pressure of the air against the under surface of the parachute when the latter is expanded into its safety position, I provide a plurality of openings 6 in the transverse web 5.

While I have pictured and described the safety appliance of my invention as attached to an airship of the biplane type and as embodying certain details for folding the webs of the parachute, I do not wish to be limited to this particular application of my invention nor to the particular details of construction herein disclosed, since the same might be varied in many respects without departing from the spirit of my invention as shown in the appended claims.

I claim as my invention:—

1. In an airship having front and rear portions connected by a plurality of frame members, a parachute normally housing the said frame members, spring-actuated mechanism for opening the parachute, a detent controlling the said mechanism, an internal combustion motor, an ignition circuit therefor, a switch controlling the ignition circuit and equipped with a manually operable handle, and connections between the said handle and the said detent whereby the movement of the handle from its normal position will simultaneously release the said mechanism to open the parachute and open the circuit to effect the stopping of the engine.

2. In an airship having front and rear portions connected by a plurality of frame members, a parachute normally housing the said frame members and equipped with ribs normally extending parallel to the said frame members, resilient members extending transversely of the consecutive frame members and engaging ribs upon the parachute to tend to force the latter outwardly, a movable detent engaging the free ends of said ribs to retain the same in their normal position, and spring means associated with said detent for moving the same out of its said engaging relation to the ribs, thereby permitting the said resilient members to move the said ribs to open the parachute.

3. In an airship, a plurality of substantially parallel frame members disposed about an axis extending longitudinally of the airship, a parachute normally housing the said frame members, the membranes of the said parachute secured at one end to the said frame members and normally flexed inwardly of the said frame into a sectionally star-shaped formation; ribs secured to the respective membrane portions intermediate of the connection between each membrane portion and the frame members to which the latter is connected, the said ribs normally extending in proximity to the said axis and pivotally connected at one end to the said axis, and releasable means for holding the said ribs in their said normal positions.

4. In an airship having front and rear portions connected by a plurality of substantially parallel frame members, a parachute normally housing the said frame members, the webs of the said parachute secured at one end to the said frame members and normally flexed inwardly of the said frame into a sectionally star-shaped formation; ribs secured to the respective web portions intermediate of the connection between each web portion and the frame members to which the latter is connected, the said ribs normally extending in proximity to the axis of the said frame members, and air-deflecting shields covering the openings of the said substantially star-shaped sections of the webs at one end thereof.

5. In an airship having front and rear portions connected by a plurality of substantially parallel frame members, a parachute normally housing the said frame members, the membranes of the said parachute secured at one end to the said frame members and normally flexed inwardly of the said frame into a sectionally star-shaped formation; ribs secured to the respective membrane portions intermediate of the connection between each membrane portion and the frame members to which the latter is connected, the said ribs normally extending in proximity to the axis of the first-named series of frame members; releasable means for holding the said ribs in their said normal positions; spring-actuated mechanism for operating the said releasable means, and a manually operable detent for releasing the said spring-actuated mechanism to permit the latter to actuate the said releasable means.

6. In an airship having front and rear portions connected by a plurality of substantially parallel frame members, a parachute normally housing the said frame members, the membranes of the said parachute secured at one end to the said frame members and normally flexed inwardly of the said frame into a sectionally star-shaped formation; ribs secured to the respective membrane portions intermediate of the connection between each membrane portion and the frame members to which the latter is connected, the said ribs normally extending in proximity to the axis of the first-named series of frame members; releasable means for holding the said ribs in their said normal positions; and resilient members disposed transversely of and connecting the said frame members and bearing outwardly against the said ribs and tending to force the latter outwardly to effect the opening of the parachute.

7. In an airship having front and rear portions connected by a plurailty of substantially parallel frame members, a parachute normally housing the said frame members, the membranes of the said parachute secured at one end to the said frame members and normally flexed inwardly of the said frame into a sectionally star-shaped formation; ribs secured to the respective membrane portions intermediate of the connection between each membrane portion and the frame members to which the latter is connected, the said ribs normally extending in proximity to the axis of the first-named series of frame members; releasable means for holding the said ribs in their said normal positions; and a pair of stops secured to the outer surface of each membrane portion, the respective pairs of stops interlocking with each other when the membrane portions are folded to hold the latter in their said star-shaped formation.

8. In an airship having front and rear portions connected by a plurality of substantially parallel frame members, a parachute normally housing the said frame members, the webs of the said parachute secured at one end to the said frame members and normally flexed inwardly of the said frame into a sectionally star-shaped formation; ribs secured to the respective web portions intermediate of the connection between each web portion and the frame members to which the latter is connected, the said ribs normally extending in proximity to the axis of the said frame members, an air-deflecting shield normally covering the opening of the said substantially star-shaped section of the web at one end thereof, and manually actuated means for withdrawing said shield from its normal position to permit air to enter and expand the parachute.

In testimony whereof I have signed my name in presence of two subscribing witnesses.

ANTON MAYER.

Witnesses:
ALBERT SCHEIBLE,
M. M. BOYLE.